United States Patent
Suzuka et al.

(10) Patent No.: US 7,319,884 B2
(45) Date of Patent: Jan. 15, 2008

(54) FM RADIO DEVICE AND TRANSMISSION POWER CONTROL METHOD

(75) Inventors: Masaki Suzuka, Kanagawa (JP); Mikio Hanabusa, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 554 days.

(21) Appl. No.: 11/000,217

(22) Filed: Dec. 1, 2004

(65) Prior Publication Data

US 2005/0119022 A1 Jun. 2, 2005

(30) Foreign Application Priority Data

Dec. 2, 2003 (JP) .............................. 2003-402625

(51) Int. Cl.
*H04B 7/00* (2006.01)
*H04Q 7/20* (2006.01)

(52) U.S. Cl. .................. 455/522; 455/63.1; 455/67.13; 455/69; 455/184.1; 455/186.1; 455/239.1; 455/403; 455/550.1; 455/205; 455/260; 375/142; 375/150; 375/343; 375/346; 375/376

(58) Field of Classification Search ................ 455/522, 455/63.1, 67.13, 184.1, 186.1, 239.1, 550.1, 455/205, 69, 260, 403; 370/913; 375/316, 375/142, 150, 343, 346, 376; 704/226

See application file for complete search history.

(56) References Cited

U.S. PATENT DOCUMENTS 5,339,453 A * 8/1994 Sugayama et al. ........ 455/239.1

(Continued)

FOREIGN PATENT DOCUMENTS

JP 63-292835 11/1988

(Continued)

OTHER PUBLICATIONS

Japanese Office Action, with English Translation, issued in corresponding Japanese Patent Application No. JP 2004-345481, dated on Oct. 2, 2007.

*Primary Examiner*—Matthew Anderson
*Assistant Examiner*—Shaima Q. Aminzay
(74) *Attorney, Agent, or Firm*—McDermott Will & Emery LLP

(57) ABSTRACT

A transmission power control method includes a step (a) of receiving by a receiver a radio wave signal, a step (b) of judging whether a first identification signal is included in the received radio wave signal, a step (c) of detecting a reception electric field intensity of the radio wave signal included in the radio wave signal in the case where the first identification signal is included in the radio wave signal, a step (d) of obtaining a radio wave propagation state between a home station and the station to communicate with by using the reception electric field intensity detected at the step (c) and determining transmission power of the transmission radio wave signal based upon the radio wave propagation state, a step (g) of invalidating the radio wave propagation state obtained upon the previous reception in the case where the interval between an end of communication and a restart of communication is longer than a time determined in advance, a step (e) of superimposing a second identification signal on the transmission radio wave signal and a step (f) of controlling such that the transmission power of the transmission radio wave signal becomes the value determined at the step (d).

12 Claims, 7 Drawing Sheets

U.S. PATENT DOCUMENTS

| | | | |
|---|---|---|---|
| 5,507,024 A * | 4/1996 | Richards, Jr. | 455/260 |
| 2002/0065057 A1* | 5/2002 | Kasperkovitz | 455/205 |
| 2002/0183034 A1* | 12/2002 | Fayyaz | 455/324 |

FOREIGN PATENT DOCUMENTS

| | | |
|---|---|---|
| JP | 02-148920 | 6/1990 |
| JP | 05-055948 | 3/1993 |
| JP | 06-350477 | 12/1994 |
| JP | 07-143055 | 6/1995 |
| JP | 7-212303 | 8/1995 |
| JP | 11-284569 | 10/1999 |
| JP | 2003-069492 | 3/2003 |
| JP | 2003-244071 | 8/2003 |

* cited by examiner

FM RADIO DEVICE AND TRANSMISSION POWER CONTROL METHOD

CROSS-REFERENCE TO RELATED APPLICATIONS

This application is based upon and claims the benefit of priority from the prior Japanese Patent Application No. 2003-402625, filed Dec. 2, 2003 based upon 35 U.S.C 119(a), entire contents of which are incorporated herein by reference.

BACKGROUND OF THE INVENTION

1. Field of the Invention

The present invention relates to a reduction in power consumption of a FM radio device.

2. Prior Arts

A reduction in power consumption has been promoted to prolong an operable time in a FM radio device. A conventional measure for reducing power consumption is disclosed in, for example, Japanese Unexamined Patent Application Publication No. 7-212303. This application discloses a power control method for reducing power consumption of an FM radio device.

FIG. 10 is a block diagram showing a conventional FM radio device. In the FM radio device shown in this drawing, radio signal modulated by a baseband signal is received by an antenna 101, passes through a transmit-receive branching filter 102 and frequency converted and demodulated by a receiver 103. The reception electric field intensity of the radio signal is detected by an electric field intensity detecting circuit 104, using a radio signal converted and demodulated by the receiver 103 and the baseband signal, whereby the transmission power information of the station to communicate with is decoded by a transmission power information decoder 105. The transmission power information of the station to communicate with includes information on the radio signal modulated by a baseband signal from the station to communicate with. A transmission power determining circuit 106 obtains a radio wave propagation state between a home station and the station to communicate with by using the reception electric field intensity detected by the electric field intensity detecting circuit 104 and the transmission power information of the station to communicate with which is decoded by the transmission power information decoder 105. A power control circuit 107 is controlled so that the transmission power is one determined by the transmission power determining circuit 106 from the radio wave propagation state. Then, the transmission power information on the home station is coded by a transmission power information encoder 108. The coded transmission power information is added to the baseband signal, passes through a transmitter 109 and the transmit-receive branching filter 102, and then, is transmitted to the station to communicate with by the antenna 101 as a radio wave modulated by the baseband signal.

SUMMARY OF THE INVENTION

However, the conventional FM radio device does not identify the station to communicate with, so that there is a case where unnecessary power is consumed due to the voice output from other station that is not the station to communicate with. The unnecessary power consumption as described above causes a fear of decreasing the communication time with the station that is to be originally communicated with in the conventional FM radio device. Further, the information holding time of the obtained radio wave propagation state is not considered, so that there is a possibility that the current radio wave propagation state is changed from the previous communication upon determining the transmission power of the home station, thereby being likely to cause any trouble in the communication with the station to communicate with. Moreover, in the case where the transmission power of the home station is determined by the reception electric field intensity and the transmission power information of the station to communicate with without considering the reception noise caused by the other station, that is not the station to communicate with, using the same frequency band, the transmission power is too restrained, thereby being likely to cause any trouble in the communication with the station to originally communicate with.

In view of the above-mentioned problem, the present invention aims to provide a communication device and communication method wherein power consumption is reduced without causing any trouble in the communication with a station to be communicated with.

In order to attain the aforesaid object, a first FM radio device according to the present invention includes a receiver that receives a radio wave signal modulated by the baseband signal and frequency converts and demodulates the radio wave signal modulated by the baseband signal, an identification signal detecting circuit that judges whether a first identification signal, which is determined in advance between a home station and a station to communicate with, is superimposed on the baseband signal generated by frequency converting and demodulating the radio wave signal modulated by the baseband signal, and a transmitter that outputs the radio wave signal modulated by the baseband signal. Further, the first FM radio device includes an electric field intensity detecting circuit that detects a reception electric field intensity of the radio wave signal modulated by the baseband signal and received by the receiver, a transmission power determining circuit that obtains a radio wave propagation state between the home station and the station to communicate with by using at least the reception electric field intensity detected by the electric field intensity detecting circuit and determines transmission power of the radio wave signal modulated by the baseband signal and output from the transmitter based upon the radio wave propagation state, a power control circuit that controls transmission power of the radio wave signal modulated by the baseband signal and output from the transmitter so as to become the transmission power determined by the transmission power determining circuit and an identification signal superimposing circuit that superimposes a second identification signal, that is determined in advance between the home station and the station to communicate with, on the transmission information signal output from the transmitter.

In the first FM radio device, the station to communicate with can be recognized by recognizing the identification signal by the identification signal detecting circuit, thereby establishing a stable communication with the station to communicate with without voice output to be output from other stations, resulting in being capable of restraining useless power consumption.

Further, the first FM radio device is provided with a timer circuit that invalidates the radio wave propagation state obtained upon the previous reception in the case where the interval between and end of communication and a restart of communication, thereby being capable of changing the transmission power according to the change in the radio wave propagation state between the home station and the station to communicate with. Therefore, the transmission power can be set to a suitable value, thereby being capable of preventing a trouble such as break-off of the communication, and of restraining surplus power consumption.

It is preferable that the identification signal detecting circuit is designed to stop the signal output from the receiver in the case where the radio wave signal modulated by the baseband signal does not include the first identification signal. This can prevent the signal output from the other station from jamming the communication with the station to communicate with.

The first FM radio device may further includes a transmission power information decoder that decodes first transmission power information indicating the transmission power of the radio wave modulated by the baseband signal and transmitted from the station to communicate with, a reception noise detecting circuit that detects power of a reception noise included in the radio wave signal modulated by the baseband signal, and a transmission power information encoder that encodes second transmission power information indicating the transmission power of the radio wave signal modulated by the baseband signal and determined by the transmission power determining circuit and superimposes the coded second transmission power information on the transmission information signal output from the transmitter. In this case, the transmission power determining circuit obtains the radio wave propagation state between the home station and the station to communicate with by further using the first transmission power information decoded by the transmission power decoder and the detected result by the reception noise detecting circuit. With this structure, the transmission power is determined based upon not only the electric field intensity of the received radio wave signal but also the power of the reception noise and the transmission power information of the station to communicate with. Consequently, the radio wave propagation state can more accurately be grasped than conventional device, thereby being capable of stabilizing the communication state. Moreover, the transmission power does not increase more than necessary, thereby reducing power consumption.

Alternately, the first FM radio device may further includes an electric field intensity information decoder that decodes first reception electric field intensity information indicating the reception electric field intensity of the radio wave signal modulated by the baseband signal and output from the transmitter at the station to communicate with, a reception noise detecting circuit that detects the magnitude of a reception noise included in the radio wave signal, and a transmission power information encoder that codes second reception electric field intensity information indicating the reception electric field intensity of the radio wave signal modulated by the baseband signal and received by the receiver and superimposes the coded second reception electric field intensity information on the radio wave signal modulated by the baseband signal and output from the transmitter. The transmission power of the radio wave signal modulated by the baseband signal can be set to a required sufficient value even by using the reception electric field intensity information of the radio wave signal at the station to communicate with instead of the transmission power information.

A second FM radio device according to the present invention includes a receiver that receives a radio wave signal modulated by the baseband signal and demodulates the radio wave signal modulated by the baseband signal, a transmitter that outputs a transmission radio wave signal, and an electric field intensity detecting circuit that detects the reception electric field intensity of the radio wave signal modulated by the baseband signal and received by the receiver. Further, the second FM radio device includes a transmission power determining circuit that obtains a radio wave propagation state between a home station and the station to communicate with by using at least the reception electric field intensity detected by the electric field intensity detecting circuit and determines transmission power of the radio wave signal modulated by the baseband signal and output from the transmitter based upon the radio wave propagation state, a timer circuit that invalidates the radio wave propagation state obtained upon the previous reception in the case where the interval between an end of communication and a restart of communication is longer than the predetermined information holding time, and a power control circuit that controls the transmission power of the radio wave signal modulated by the baseband signal and output from the transmitter so as to become the transmission power determined by the transmission power determining circuit.

With this structure, the timer circuit invalidates the previous radio wave propagation state in the case where the communication is restarted after more than a predetermined time has elapsed from the previous communication, thereby being capable of setting the transmission power according to the change in the radio wave propagation state. Consequently, a trouble such as break-off of the communication can be prevented and power consumption can be reduced.

A transmission power control method according to the present invention is a transmission power control method in a FM radio device having a receiver that demodulates a radio wave signal modulated by the baseband signal from a station to communicate with and a transmitter that outputs the radio wave signal modulated by the baseband signal and is to be transmitted to the station to communicate with. The transmission power control method of the present invention comprises a step (a) of receiving by the receiver a radio wave signal modulated by the baseband signal, a step (b) of judging whether a first identification signal determined in advance between a home station and the station to communicate with is included in the radio wave signal modulated by the baseband signal and received at the step (a), a step (c) or detecting a reception electric field intensity of the radio wave signal modulated by the baseband signal in the case where the first identification signal is judged to be included in the radio wave signal modulated by the baseband signal at the step (b), a step (d) of obtaining a radio wave propagation state between the home station and the station to communicate with by using the reception electric field intensity detected at the step (d) and determining transmission power of the radio wave signal modulated by the baseband signal and output from the transmitter based upon the radio wave propagation state, a step (e) of superimposing a second identification signal, determined in advance between the home station and the station to communicate with, on the radio wave signal modulated by the baseband signal, and a step (f) of controlling such that the transmission power of the radio wave signal modulated by the baseband signal and output from the transmitter becomes the value determined at the step (d).

The first identification signal is recognized at the step (b) according to this method. Therefore, the information transmitted from the other station is controlled so as not to be output for inhibiting communication by information from the other station, thereby being capable of reducing power consumption.

Further, the transmission power control method is provided with a step (g) of invalidating the radio wave propagation state obtained upon the previous reception in the case where the interval between an end of communication and a restart of communication is longer than the predetermined information holding time, thereby being capable of setting transmission power according to the change in the radio wave propagation state between the home station and the station to communicate with. Moreover, superimposing the second identification signal prevents the communication from being jammed by the information from the station other than the home station at the station to communicate with, thereby being capable of reducing power consumption. Specifically, the transmission power control method of the present invention can stabilize the communication as a whole communication system and reduce power consumption.

It is preferable to further provide a step (h) of stopping the signal output from the receiver, in the case where the first identification signal is judged not to be included in the radio wave signal modulated by the baseband signal at the step (b).

The first transmission power information indicating the transmission power of the radio wave signal modulated by the baseband signal and transmitted from the station to communicate with is superimposed on the radio wave signal modulated by the baseband signal, and the transmission power control method further comprises a step (i) before the step (d) of decoding the first transmission power information, a step (j) before the step (d) of detecting the power of the reception noise included in the radio wave signal, and a step (k) of coding the second transmission power information indicating the transmission power of the transmission radio wave signal, which is modulated by the baseband signal, determined at the step (d) and superimposing the coded second transmission power information on the radio wave signal output from the transmitter, wherein it is preferable to obtain the radio wave propagation state by using further the first transmission power information decoded at the step (i) and the power of the reception noise detected at the step (j).

Further, first reception electric field intensity information indicating the reception electric field of the radio wave signal modulated by the baseband signal and output from the transmitter at the station to communicate with is superimposed on the radio wave signal, and the transmission power control method further includes a step (i) before the step (d) of decoding the first reception electric field intensity information, a step (m) before the step (d) of detecting the power of the reception noise included in the radio wave signal and a step (n) of coding second reception electric field intensity information indicating the reception electric field intensity of the radio wave signal received by the receiver and superimposing the coded second reception electric field intensity information on the transmission radio wave signal output from the transmitter, wherein it is preferable to obtain the radio wave propagation state by using further the first reception electric field intensity information decoded at the step (i) and the power of the reception noise detected at the step (m).

At the step (f), the transmission power of the radio wave signal modulated by the baseband signal and output from the transmitter is alternately switched between the value determined at the step (d) and the maximum value every predetermined time interval, thereby being capable of suppressing power consumption of the home station and the station to communicate with.

DESCRIPTION OF THE PREFERRED EMBODIMENTS

First Embodiment

Hereinafter, a power control method of a FM radio device according to a first embodiment of the present invention will be described with reference to the accompanying drawings.

(Construction of FM Radio Device)

Figure 1:
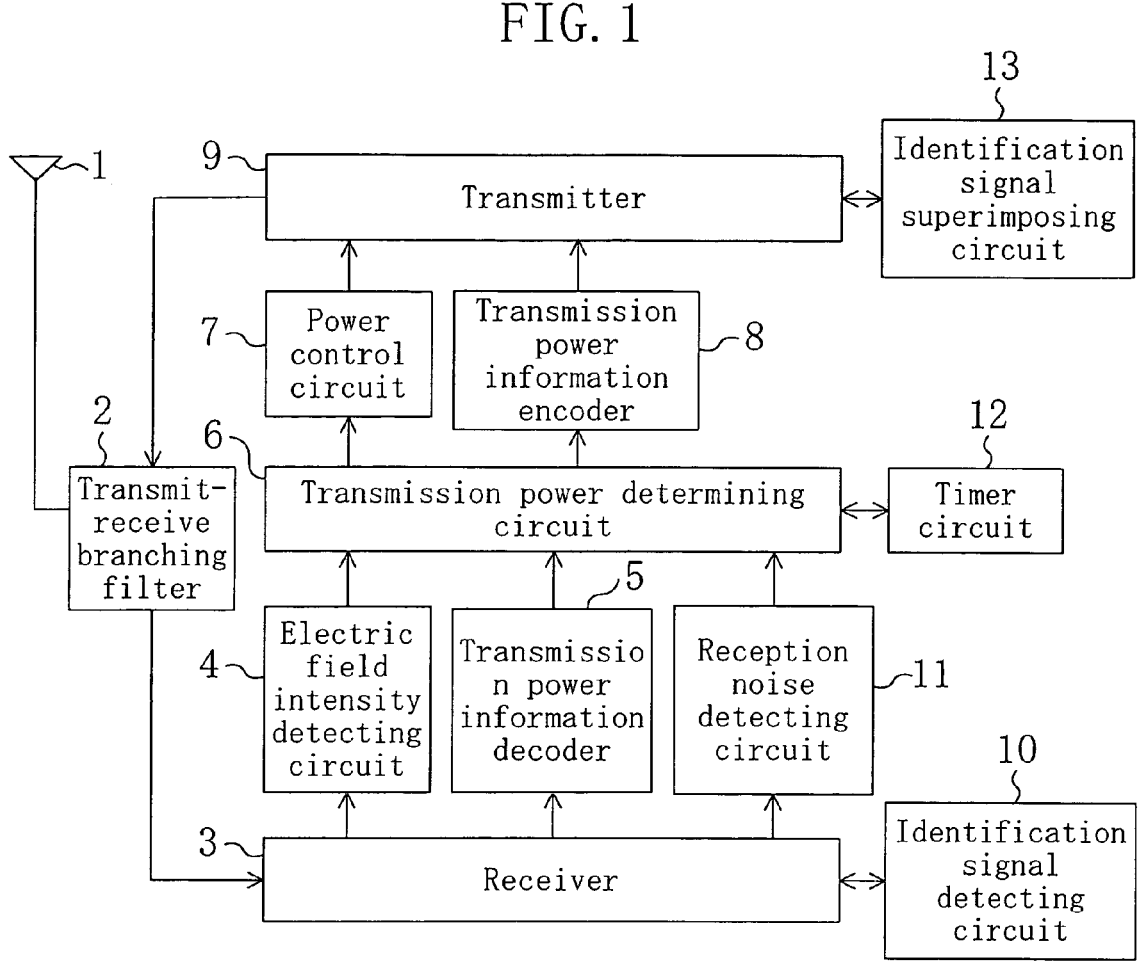
FIG. 1 is a block diagram showing a configuration example of a FM radio device according to a first embodiment of the present invention.

FIG. 1 is a block diagram showing a FM radio device according to the first embodiment of the present invention.

As shown in this drawing, the FM radio device of the present embodiment is provided with an antenna 1 that receives a radio wave signal modulated by a baseband signal, a transmit-receive branching filter 2 connected to the antenna 1, a receiver 3 that receives the radio wave signal modulated by the baseband signal through the transmit-receive branching filter 2 and frequency-converts and demodulates the radio wave signal modulated by the baseband signal, an identification signal detecting circuit 10 that judges whether an identification signal determined in advance between the home station and a station to communicate with is superimposed on the radio wave signal, which is modulated by the baseband signal, received by the receiver 3, an electric field intensity detecting circuit 4 for detecting the electric field intensity (i.e., reception electric field intensity) of the radio wave signal, which is modulated by the baseband signal, received by the receiver 3, a transmission power information decoder 5 that decodes the transmission power information of the station to communicate with included in the radio wave signal, which is modulated by the baseband signal, received by the receiver 3 and a reception noise detecting circuit 11 that detects the reception noise included in the radio wave signal, which is modulated by the baseband signal, received by the receiver 3. The transmit-receive branching filter 2 is required to perform reception and transmission by the same antenna 1. It should be noted that the baseband signal includes a voice signal in the case of the FM radio device.

Further, the FM radio device of the present embodiment has a transmission power determining circuit 6 that obtains a radio wave propagation state between the home station and the station to communicate with by using the electric field intensity of the radio wave signal, which is modulated by the baseband signal, detected by the electric field intensity detecting circuit 4, the transmission power information of the station to communicate with decoded by the transmission power information decoder 5 and the power of the reception noise detected by the reception noise detecting circuit 11 and determines the transmission power from its radio wave propagation state, and a timer circuit 12 that invalidates the radio wave propagation state upon the previous communication in the case where the communication interval is longer than the an information holding time determined in advance.

Moreover, the FM radio device of the present embodiment has a transmitter 9 that outputs the transmission radio wave signal which is modulated by the baseband signal and is to be transmitted to the station to communicate with, a power control circuit 7 that controls the transmission power of the radio wave signal which is modulated by the baseband signal and output from the transmitter 9 so as to become the value according to the transmission power determined by the transmission power determining circuit 6, a transmission power information encoder 8 that codes the transmission power information indicating the transmission power of the radio wave signal that is modulated by the baseband signal and superimposes the resultant on the radio wave signal, which is modulated by the baseband signal and output from the transmitter 9, and an identification signal superimposing circuit 13 that superimposes the identification signal, which is determined in advance between the home station and the station to communicate with, on the radio wave signal which is modulated by the baseband signal and output from the transmitter 9. The "radio wave signal modulated by the baseband signal" herein means a modulate signal obtained by superimposing the transmission power information and/or identification signal on the baseband signal. It should be noted that, in the FM radio device of the present embodiment, the receiver 3, the transmitter 9, a base band IC and the electric field intensity detecting circuit 4, transmission power information decoder 5, reception noise detecting circuit 11, transmission power determining circuit 6, timer circuit 12, power control circuit 7 and transmission power information encoder 8 are formed on an RF (Radio Frequency) IC.

The outline of the flow from the reception to the transmission of the information in the FM radio device explained above is as follows.

Firstly, the radio wave signal, which is modulated by the baseband signal, received by the antenna 1 passes through the transmit-receive branching filter 2 and is frequency converted and demodulated in the receiver 3. In the case where the radio wave signal, which is modulated by the baseband signal, includes the baseband signal transmitted from the station to communicate with (to speak with), the identification signal that is determined in advance between the home station and the station to communicate with and the transmission power information indicating the electric field intensity of the signal output from the station to communicate with are superimposed on the baseband signal. The identification signal and the transmission power information are signals having a frequency band different from the normal information signal (voice signal). In the case where the identification signal is included in the radio wave signal, which is modulated by the baseband signal, received by the receiver 3, the identification signal detecting circuit 10 detects the identification signal and causes the frequency converted and demodulated IF signal and the baseband signal to be output to the electric field intensity detecting circuit 4, transmission power information decoder 5 and reception noise detecting circuit 11 respectively from the receiver 3. Further, in the case where the identification signal of the station to communicate with is not included in the radio wave signal modulated by the baseband signal, the identification signal detecting circuit 10 brings the receiver 3 into a stand-by state and stops the signal output from the receiver 3.

Subsequently, if the identification signal of the station to communicate with is included in the radio wave signal modulated by the baseband signal, the reception electric field intensity of the information signal of the radio wave signal is detected by the electric field intensity detecting circuit 4 and its detected result is output to the transmission power determining circuit 6. Moreover, the transmission power information included in the radio wave signal modulated by the baseband signal and output from the receiver 3 is decoded by the transmission power information decoder 5 and output to the transmission power determining circuit 6. Further, the power of the reception noise included in the radio wave signal modulated by the baseband signal is detected by the reception noise detecting circuit 11 and its detected result is output to the transmission power determining circuit 6.

Subsequently, the transmission power determining circuit 6 obtains the radio wave propagation state between the home station and the station to communicate with by using the reception electric field intensity of the radio wave signal detected by the electric field intensity detecting circuit 4, the transmission power information of the station to communicate with decoded by the transmission power information decoder 5 and the power of the reception noise detected by the reception noise detecting circuit 11. Moreover, the transmission power determining circuit 6 determines the transmission power of the radio wave signal modulated by the baseband signal and output from the home station based upon the radio wave propagation state between the home station and the station to communicate with. The timer circuit 12 judges whether the communication interval, namely, a time from an end of communication to a restart of communication is longer than the predetermined information holding time.

If the communication interval is longer than the information holding time, the timer circuit 12 invalidates the radio wave propagation state obtained upon the previous communication. In this case, the transmission power is determined by the transmission power determining circuit 6 based upon the newly obtained radio wave propagation state. The power control circuit 7 controls the transmission power of the radio wave signal modulated by the baseband signal and output from the transmitter 9 according to the determined transmission power. This can prevent a trouble such as a broken off of the communication is upon the re-start of the communication (call).

On the other hand, if the communication interval is not more than the information holding time, the radio wave propagation state obtained by the transmission power determining circuit 6 upon the previous communication is continuously used, whereby the transmission power is set based upon this state.

Further, the transmission power information encoder 8 codes the transmission power information of the home station and superimposes this transmission power information on the radio wave signal modulated by the baseband signal and output from the transmitter 9. Moreover, the identification signal is superimposed on the radio wave signal, which is modulated by the baseband signal, by the identification signal superimposing circuit 13.

Then, the radio wave signal modulated by the baseband signal and output from the transmitter 9 is transmitted from the antenna 1 via the transmit-receive branching filter 2.

(Explanation of a Circuit Configuration and Components of the FM Radio Device)

Hereinafter explained is a section or circuit that is a characteristic part of the FM radio device of this embodiment.

Figure 4:
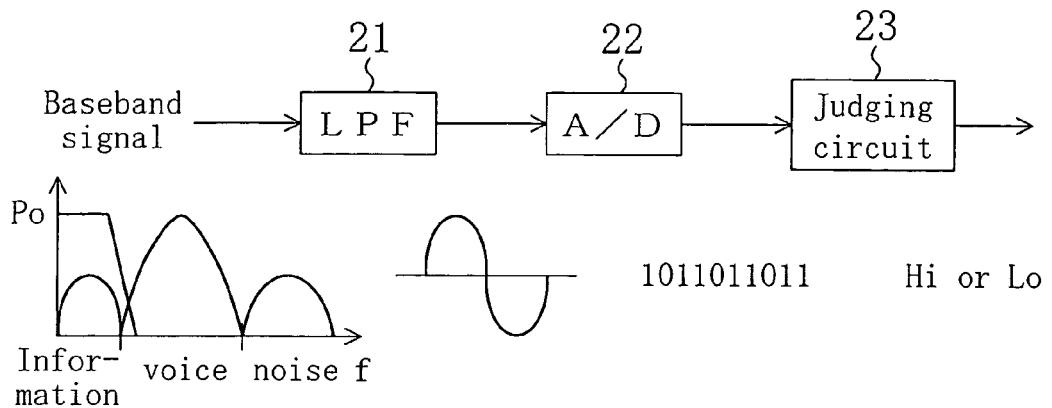
FIG. 4 is a view showing a configuration example of an identification signal detecting circuit used for the FM radio device according to each embodiment of the present invention and a signal waveform at each section.

FIG. 4 is a view showing a configuration example of the identification signal detecting circuit 10 used for the FM radio device according to each embodiment of the present invention and a signal waveform at each section. As shown in this drawing, there are provided a low pass filter (LPF) 21 that receives the baseband signal demodulated by the receiver 3, an A/D converter 22 that receives the output from the LPF 21 and a judging circuit 23 that judges whether the identification signal of the station to communicate with is superimposed on the radio wave signal output from the A/D converter 22 and outputs the judging result to the receiver 3.

In the identification signal detecting circuit 10 of the present invention, the identification signal superimposed on the baseband signal demodulated by the receiver 3 is detected by using the LPF 21. The identification signal passing through the LPF 21 is converted into a digital signal by the A/D converter 22, and then, compared to a code that is determined in advance between the home station and the station to communicate with in the judging circuit 23. The judging circuit 23 gives an output permission of voice to the receiver 3 when the received identification signal matches to the code determined in advance between the home station and the station to communicate with.

In the example shown here, the transmission power information is present in a frequency band lower than the voice signal or noise like the identification signal. Therefore, the transmission power information decoder 5 is configured to include the LPF, A/D converter and judging circuit like the identification signal detecting circuit 10. The judging device prepare several codes according to the magnitude of the transmission power, judges with which prepared code the coded transmission power information agrees and outputs the judged result to the receiver 3. With this structure, the transmission power information of the station to communicate with superimposed on the baseband signal demodulated by the receiver 3 is detected by the LPF and the transmission power of the station to communicate with can be derived in the judging circuit 23.

Figure 5:
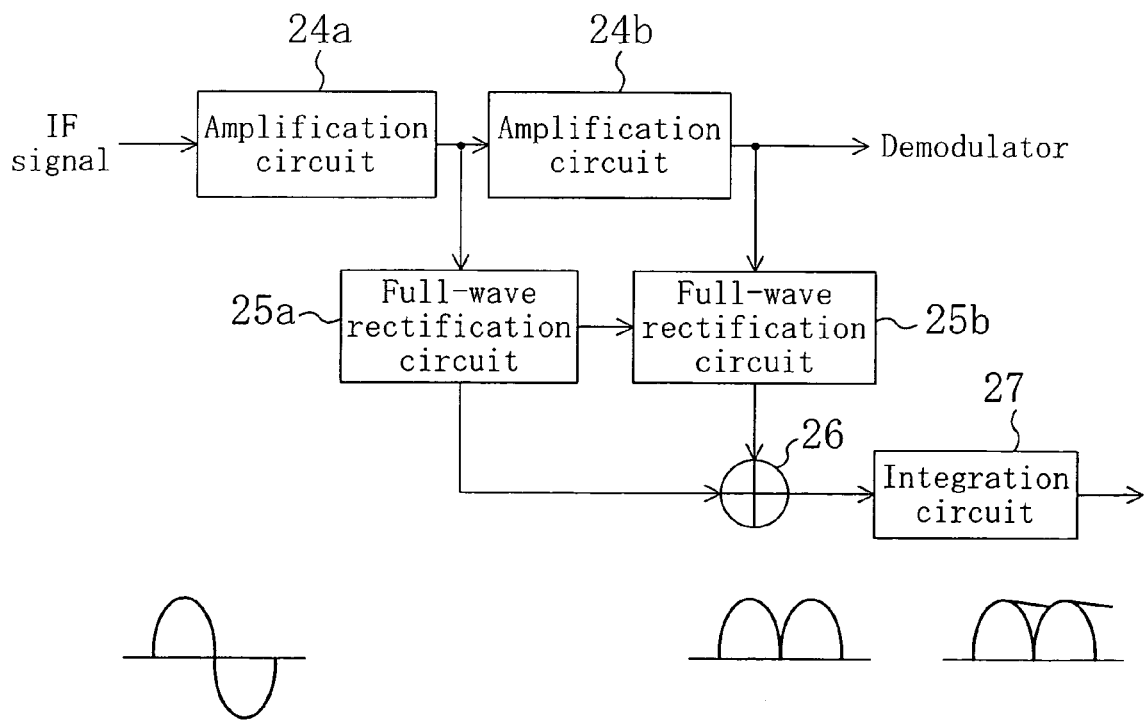
FIG. 5 is a view showing a configuration example of an electric field intensity detecting circuit used for the FM radio device according to each embodiment of the present invention and a signal waveform at each section.

Further, FIG. 5 is a configuration example of the electric field intensity detecting circuit 4 used for the FM radio device according to each embodiment of the present invention and a signal waveform at each section. As shown in this drawing, the electric field intensity detecting circuit 4 of the present invention has an amplification circuit 24a that receives and amplifies the IF signal frequency converted by the receiver 3, an full-wave rectification circuit 25a and an amplification circuit 24b which receive an output of the amplification circuit 24a, an full-wave rectification circuit 25b that receives an output of the amplification circuit 24b, an adder circuit 26 that receives an output of the full-wave rectification circuit 25a and an output of the full-wave rectification circuit 25b, and an integration circuit 27 that receives an output of the adder circuit 26. It is noted that each number of the amplification circuits and the full-wave rectification circuits is not limited to two.

Figure 6:
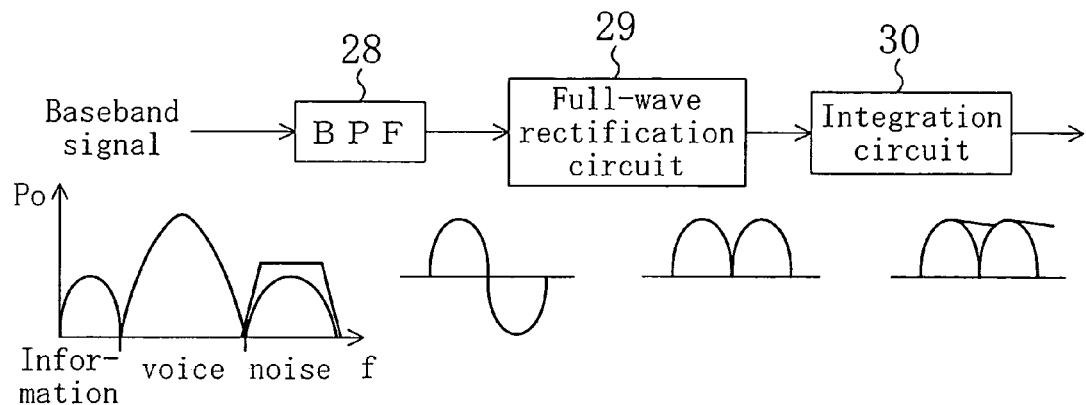
FIG. 6 is a diagram showing a configuration example of a reception noise detecting circuit used for the FM radio device according to each embodiment of the present invention and a signal waveform at each section.

In the electric field intensity detecting circuit 4 of the present invention, the IF signal frequency converted by the receiver 3 is amplified by the amplification circuit 24a and the amplification circuit 24b. Each output of the amplification circuit 24a and the amplification circuit 24b is sent through the full-wave rectification circuit 25a and the full-wave rectification circuit 25b to the adder circuit 26 to be added, and then, is input to the integration circuit 27. Subsequently, the integration circuit 27 derives the reception electric field intensity Moreover, FIG. 6 is a configuration example of the reception noise detecting circuit 11 used for the FM radio device according to each embodiment of the present invention and a signal waveform at each section. As shown in the drawing, the reception noise detecting circuit 11 has a band pass filter (BPF) 28 that receives a baseband signal demodulated by the receiver 3 and passes a baseband signal (noise signal), a fill-wave rectification circuit 29 that receives an output of the BPF 28, and an integration circuit 30 that receives an output of the full-wave rectification circuit 29.

In the reception noise detecting circuit 11, the BPF 28 detects the baseband signal (noise signal) component demodulated by the receiver 3. The noise signal component is input to the integration circuit 30 via the full-wave rectification circuit 29. Then, the integration circuit 30 derives reception noise information indicating the power of the reception noise.

Figure 7:
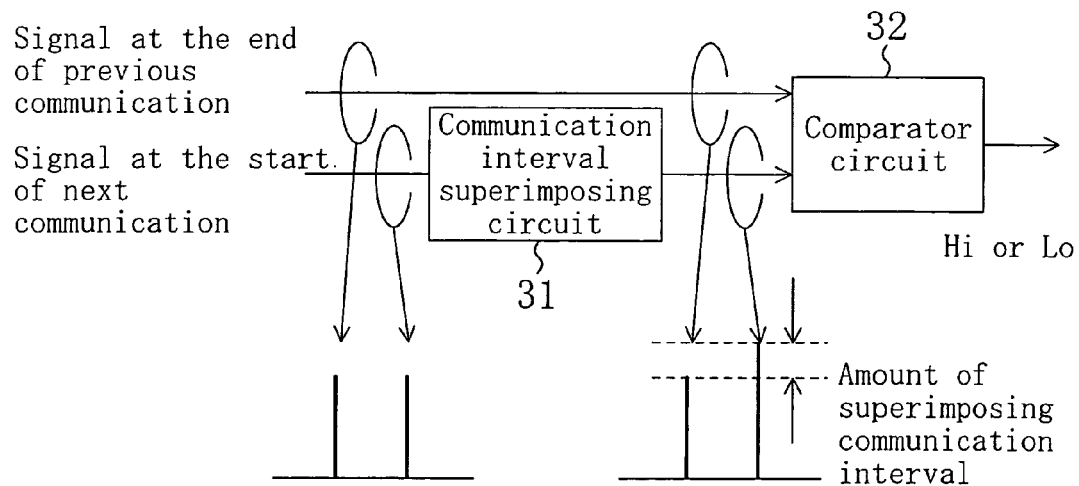
FIG. 7 is a view showing a configuration example of a timer circuit used for the FM radio device according to each embodiment of the present invention.

FIG. 7 is a view showing a configuration example of the timer circuit used for the FM radio device according to each embodiment of the present invention. The transmission power determining circuit 6 outputs a reference signal of the same level at a restart of communication and an end of communication. As shown in this drawing, the timer circuit of the present invention has a communication interval superimposing circuit 31 that receives a reference signal indicating the start of the communication determined in the transmission power determining circuit 6, adds a signal of a magnitude for the communication interval on the reference signal and outputs the resultant, and a comparator 32 that calculates a communication interval from the difference between the output from the communication interval superimposing circuit 31 and the reference signal indicating the end of the previous communication which is received from the transmission power detecting circuit 6 and compares the communication interval and the information holding time that is determined in advance.

As shown in FIG. 7, the transmission power of the radio wave signal modulated by the baseband signal at the end of the previous communication (call) and the transmission power of the radio wave signal modulated by the baseband signal at the start of the next communication are the same level in one example of the power control method of this embodiment. In other words, when communication terminals with transmission form the home station and communication restarts from the station to communicate with, a reference signal of the same level is output at the start of the communication and at the communication end. Thereafter, the communication interval superimposing circuit 31 converts the communication interval from the end of the previous communication to the start of the next communication into a magnitude of a signal, and then, outputs a signal having the magnitude for indicating the communication interval to the comparator 32 in addition to the reference signal at the end of the previous communication. Then, the comparator 32 invalidates the radio wave propagation state at the previous communication in the case where the communication interval is longer than the information holding time as a result of comparing the information holding time determined in advance and the communication interval.

Figure 8:
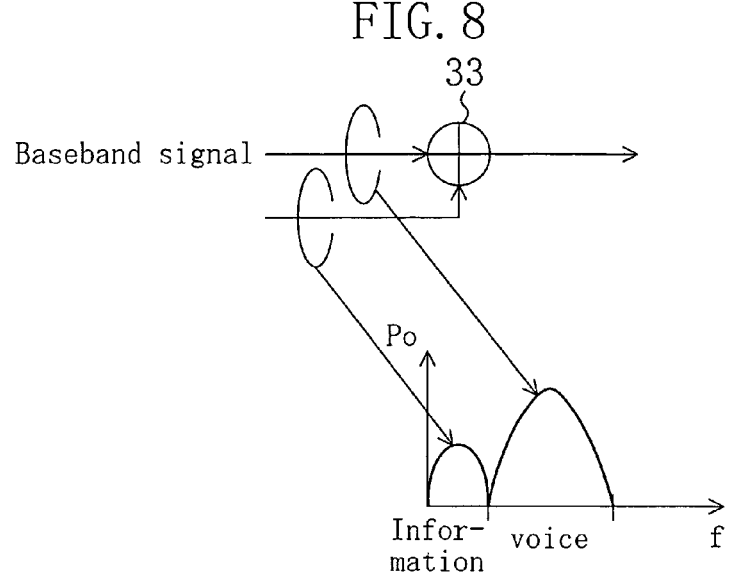
FIG. 8 is a view showing a configuration example of a transmission power information encoder used for the FM radio device according to the first embodiment of the present invention.

FIG. 8 is a view showing a configuration example of the transmission power information encoder 8 used for the FM radio device according to the embodiment. As shown in this drawing, the transmission power information encoder 8 in this embodiment has an adder circuit 33 that superimposes the identification signal determined in advance on the transmission information signal. The adder circuit 33 outputs to the transmitter 9 a signal obtained by superimposing the transmission power information on the baseband signal that is a voice signal of a speaker and modulating it by the baseband signal. The transmission power information is information indicating the transmission power of the radio wave signal modulated by the baseband signal and output from the transmitter 9.

Although not shown, the identification signal superimposing circuit 13 also has an adder circuit in the FM radio device of this embodiment. The identification signal is superimposed on the baseband signal by using this adder circuit. This identification signal is used to recognize the communication from the home station in the case where the station to communicate with has a configuration same as that of the FM radio device of this embodiment, thereby contributing to power-saving for a whole communication system. It should be noted that the circuit configurations shown in FIGS. 4 to 8 are one example of the circuit composing this embodiment, and the above-mentioned function can be realized by another configuration.

(Explanation of Power Control Method of this Embodiment)

Figure 9:
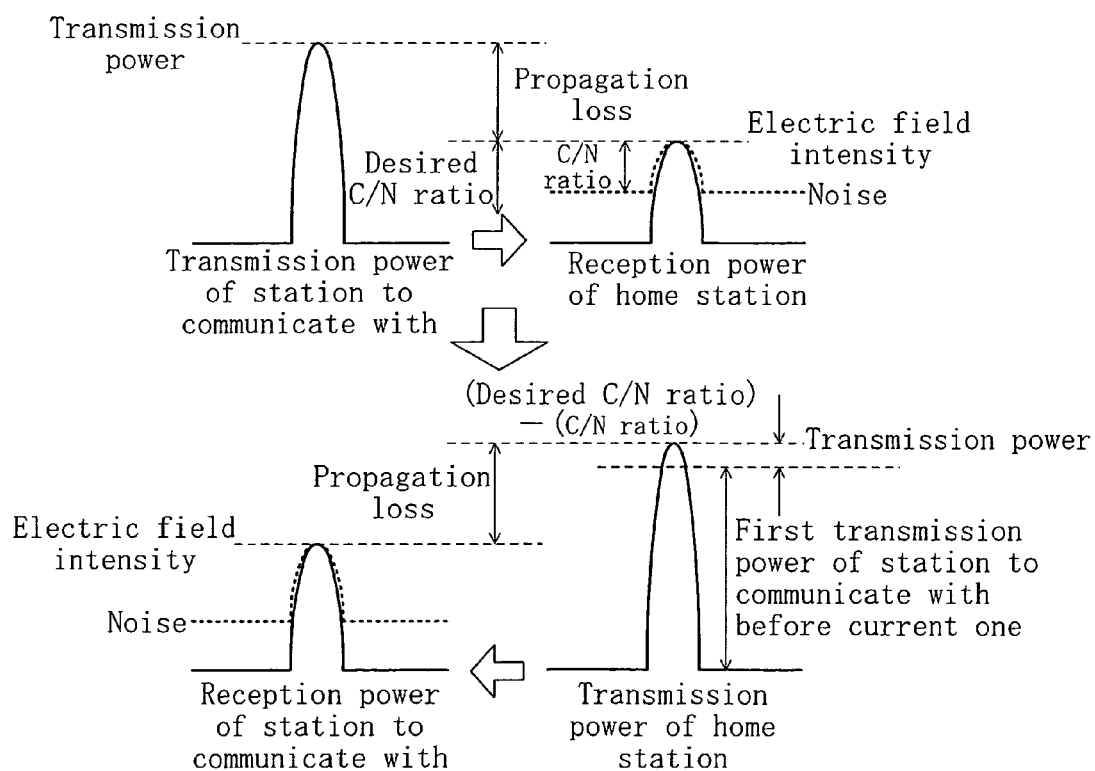
FIG. 9 is a view for explaining a power control method of the present invention executed in a transmission power determining circuit and a power control circuit.
Figure 10:
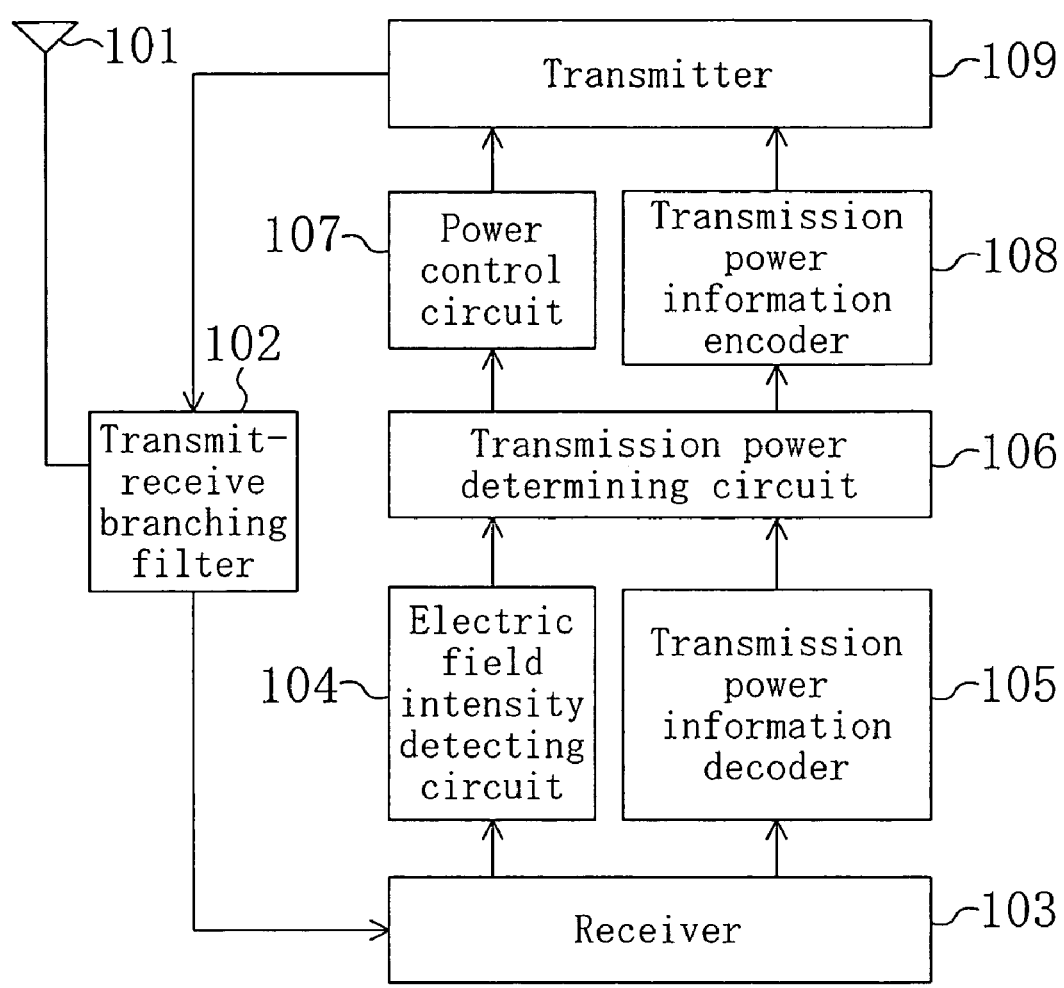
FIG. 10 is a block diagram showing a configuration example of a conventional FM radio device.

FIG. 9 is a view for explaining the power control method of this embodiment executed by the transmission power determining circuit 6 and the power control circuit 7.

As shown in the upper chart in FIG. 9, a C/N ratio of the reception radio wave signal of the home station (hereinafter referred to as "C/N ratio of the home station") is calculated in the transmission power determining circuit 6 of this embodiment from the reception electric field intensity information and the reception noise information, and then, the C/N ratio of the home station and the desired C/N ratio are compared. The C/N ratio means here a ratio of the power of the signal and the power of noise, wherein the greater value shows that the noise ratio is small. Further, the transmission power determining circuit 6 determines the transmission power of the radio wave signal modulated by the baseband signal and output from the transmitter 3 at the next communication by using the comparison result and the transmission power information of the station to communicate with. Then, the power control circuit 7 controls the transmission power of the transmission radio wave signal, which is modulated by the baseband signal, to be the determined value.

An equation about one specific example of the power control in the case of starting the communication from the station to communicate with to the home station will be shown hereinafter. It should be noted that the station to communicate with has the same configuration as that of the FM radio device of this embodiment and the transmission power of the station to communicate with at the first communication is the maximum value.

"Transmission power of home station at first communication"="Transmission power (maximum value) of station to communicate with at first communication"+(Desired C/N ratio)−(C/N ratio of home station), "Transmission power of station to communicate with at second communication"="Transmission power of home station at first communication"+ (Desired C/N ratio)−(C/N ratio of station to communicate with), {in the case where (Desired C/N ratio)−(C/N ratio of station to communicate with)≧0}

"Transmission power of station to communicate with at second communication"="Transmission power of home station at first communication"{in the case where (Desired C/N ratio)−(C/N ratio of station to communicate with)<0}

The transmission power of the station to communicate with and the home station at the communication after the second communication is determined by the same manner as described above. Further, in the case of a communication system for performing a communication between the home station and station to communicate with both being the FM radio device having the configuration shown in FIG. 1, the transmission power at the station to communicate with is also controlled by the same manner as described above.

(Operation and Effect of FM Radio Device and Power Control Method of this Embodiment)

The FM radio device according to the first embodiment of this invention identifies the station to communicate with by the identification signal detecting circuit 10 and does not output the radio wave signal output from the other station as a voice even if such information signal is received. Therefore, unnecessary power consumption can be restrained, and further, inconvenience of decreasing the communication time to the station that should originally be communicated with can be prevented.

Further, the power of the reception noise is detected by the reception noise detecting circuit 11, whereby the transmission power of the radio wave signal modulated by the baseband signal and output from the home station can be determined by considering not only the reception electric field intensity but also the reception noise. Specifically, the result of comparing the C/N ratio of the home station and the desired C/N ratio and transmission power information of the station to communicate with are reflected on the transmission power of the radio wave signal modulated by the baseband signal and output from the home station at the next communication, thereby being capable of preventing that a trouble is caused on the communication with the station that should originally be communicated with due to too restrained transmission power.

Additionally, the information holding time of the radio wave propagation state obtained by the timer circuit 12 is considered in the FM radio device of this embodiment. Specifically, the radio wave propagation state at the previous communication is invalidated in the case where the communication interval is longer than the time determined in advance, thereby being capable of setting transmission power according to the change in the radio wave propagation state. Therefore, a problem of causing a trouble in the communication with the station to communicate with can be prevented, and further, useless power consumption can be saved. In particular, setting transmission power based upon a new radio wave propagation state can bring a stabilized communication at the time of restarting the communication in the case where the communication interval is more than the predetermined time.

Further, the transmission power information encoder 8 is provided to superimpose the transmission power information of the home station on the baseband signal. Therefore, in the case where the station to communicate with and the home station have the transmission power information signal decoder and the reception noise detecting circuit, the transmission power of the radio wave signal output from the station to communicate with also considers the C/N ratio, with the result that the information signal can surely be received by both the station to communicate with and the home station.

It should be noted that, in the FM radio device of this embodiment, the transmission power may be temporarily set, at the restart of the communication, to the magnitude that the communication is possible even in the bad communication state, without providing the timer circuit 12. Then, transmission power based upon the radio wave propagation state newly obtained after that may be applied. This control also can stabilize the communication state at the restart of the communication.

Second Embodiment (Explanation of Construction of FM Radio Device)

Figure 2:
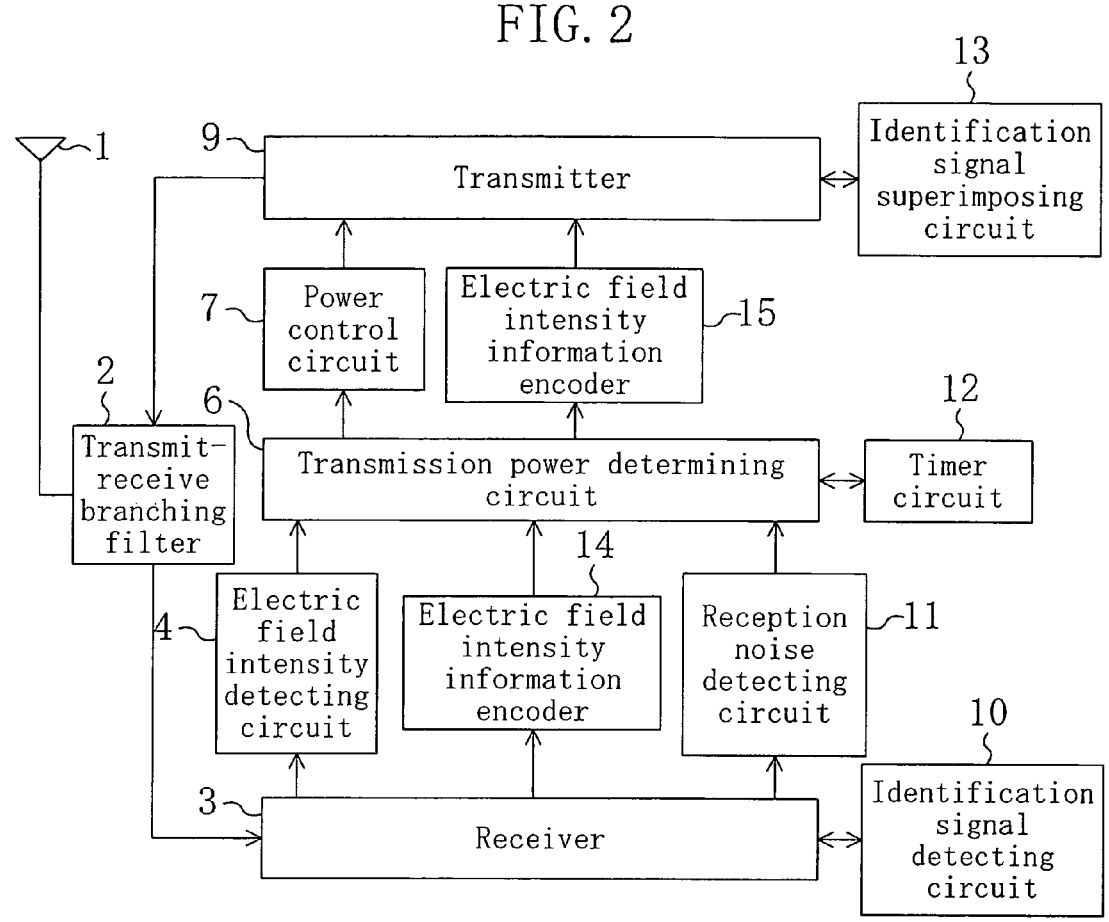
FIG. 2 is a block diagram showing a configuration example of a FM radio device according to a second embodiment of the present invention.

FIG. 2 is a block diagram showing a FM radio device according to a second embodiment of the present invention. In this drawing, circuits or components same as those of the FM radio device shown in FIG. 1 are given same numerals to omit the detailed explanation.

As shown in FIG. 2, the different point between the FM radio device of this embodiment and that in the first embodiment is that the FM radio device of this embodiment has an electric field intensity decoder 14 that decodes the reception electric field intensity information instead of the transmission power information decoder 5 in FIG. 1 and an electric field intensity information encoder 15 instead of the transmission power information encoder 8. The reception electric field intensity information means here information indicating the electric field intensity of the radio wave signal received by the station to communicate with. Further, the electric field intensity information encoder 15 codes the electric field intensity information indicating the electric field intensity of the radio wave signal modulated by the baseband signal and received by the home station.

Moreover, the electric field intensity decoder 14 can be configured to include an LPF, A/D converter and judging circuit, like the identification signal detecting circuit 10 shown in FIG. 4, for example. Further, the electric field intensity information encoder 15 can be configured to include a mixer for superimposing the electric field intensity information on the baseband signal, like the transmission power information encoder 8 shown in FIG. 8, for example.

As shown in FIG. 2, the radio wave signal including the radio wave signal modulated by the baseband signal is received by the antenna 1, passes through the transmit-receive branching filter 2 and is frequency-converted and demodulated at the receiver 3 in the FM radio device in this embodiment. In the case where this radio wave signal modulated by the baseband signal is the one transmitted from the station to communicate with, the identification signal that is determined in advance between the home station and the station to communicate with and the reception electric field intensity information are superimposed on the radio wave signal modulated by the baseband signal. The identification signal and the reception electric filed intensity information are signals having a frequency band different from the normal voice signal. In the case where the identification signal is included in the radio wave signal modulated by the baseband signal and received by the receiver 3, the identification signal detecting circuit 10 detects the identification signal and causes the frequency-converted and demodulated IF signal and the baseband signal to be output to the electric field intensity detecting circuit 4, electric field intensity information decoder 14 and reception noise detecting circuit 11 respectively from the receiver 3. Further, in the case where the identification signal of the station to communicate with is not included in the radio wave signal modulated by the baseband signal, the identification signal detecting circuit 10 brings the receiver 3 into a stand-by state and stops the signal output from the receiver 3.

Subsequently, if the identification signal of the station to communicate with is included in the radio wave signal modulated by the baseband signal, the reception electric field intensity of the radio wave signal is detected by the electric field intensity detecting circuit 4 and its detected result is output to the transmission power determining circuit 6. Moreover, the reception electric field intensity information decoded by the electric field intensity information decoder 14 and the detected result of the reception noise by the reception noise detecting circuit 11 are output to the transmission power determining circuit 6.

Subsequently, the transmission power determining circuit 6 obtains the radio wave propagation state between the home station and the station to communicate with by using the reception electric field intensity of the information signal detected by the electric field intensity detecting circuit 4, the reception electric field intensity at the station to communicate with decoded by the electric field intensity information decoder 14 and the power of the reception noise detected by the reception noise detecting circuit 11. The radio wave propagation state obtained here is held until it is invalidated by the timer circuit 12. Moreover, the transmission power determining circuit 6 determines the transmission power of the radio wave signal modulated by the baseband signal and output from the home station based upon the radio wave propagation state between the home station and the station to communicate with.

If the communication interval is longer than the information holding time, the timer circuit 12 invalidates the radio wave propagation state obtained upon the previous communication. In this case, the transmission power is determined by the transmission power determining circuit 6 based upon the newly obtained radio wave propagation state. The power control circuit 7 controls the transmission power of the radio wave signal modulated by the baseband signal and output from the transmitter 9 according to the determined transmission power. This can prevent a trouble such as a brake-off of the communication upon the re-start of the communication (call). Alternately, the transmission power may be set to a sufficiently great magnitude such that the communication is possible even if the communication state of the station to communicate with is bad immediately after the timer circuit 12 invalidates the previous radio wave propagation state. Then, the transmission power based upon the radio wave propagation state newly obtained after that may be applied.

On the other hand, if the communication interval is not more than the information holding time, the radio wave propagation state obtained by the transmission power determining circuit 6 upon the previous communication is continuously used, whereby the transmission power is set based upon this state.

Further, the electric field intensity information encoder 15 codes the reception electric field intensity information of the radio wave signal modulated by the baseband signal at the home station and superimposes this on the baseband signal. Moreover, the identification signal determined in advance between the home station and the station to communicate with is superimposed on the information signal by the identification signal superimposing circuit 13. Then, the radio wave signal modulated by the base signal and including the voice signal, electric field intensity information and information signal is transmitted from the transmitter 9 and sent to the station to communicate with from the home station via the transmit-receive branching filter 2 and the antenna 1.

An equation about one specific example of the power control in the case of starting the communication from the station to communicate with to the home station will be shown hereinafter. It should be noted that the station to communicate with has the same configuration as that of the FM radio device of this embodiment and the transmission power of the station to communicate with at the first communication is the maximum value.

"Transmission power of home station at first communication"="Transmission power (maximum value) of station to communicate with at first communication"+(Desired $C/N$ ratio)−($C/N$ ratio of home station), "Transmission power of station to communicate with at second communication"="Transmission power of station to communicate with at first communication"−(Reception electric field intensity at home station)+(Reception electric field intensity at station to communicate with)+(Desired $C/N$ ratio)−($C/N$ ratio of station to communicate with), {in the case where (Desired $C/N$ ratio)−($C/N$ ratio of station to communicate with)≧0}

"Transmission power of station to communicate with at second communication"="Transmission power of station to communicate with at first communication"−(Reception electric field intensity at home station)+(Reception electric field intensity at station to communicate with) {in the case where (Desired $C/N$ ratio)−($C/N$ ratio of station to communicate with)<0}

The transmission power of the station to communicate with and the home station at the communication after the second communication is determined by the same manner as described above.

(Operation and Effect of FM Radio Device and Power Control Method of this Embodiment)

The FM radio device according to this embodiment identifies the station to communicate with by the identification signal detecting circuit 10 and does not output the radio wave signal output from the other station as a voice even if such information signal is received. Therefore, unnecessary power consumption can be restrained, and further, inconvenience of decreasing the communication time to the station that should originally be communicated with can be prevented.

Further, the electric field intensity information decoder 14 can decode the information about the reception state of the station to communicate with, so that the transmission power of the radio wave signal modulated by the baseband signal and output from the home station can be determined by considering the electric field intensity information in addition to the reception noise information. As described above, the transmission power according to the communication state between the home station and the station to communicate with can be set even by using the electric field intensity information instead of the transmission power information.

Additionally, the information holding time of the radio wave propagation state obtained by the timer circuit 12 is considered in the FM radio device of this embodiment, like the FM radio device of the first embodiment. Specifically, the radio wave propagation state at the previous communication is invalidated in the case where the communication interval is longer than the time determined in advance, thereby being capable of setting transmission power according to the change in the radio wave propagation state. Therefore, a problem of causing a trouble in the communication with the station to communicate with can be prevented, and further, useless power consumption can be saved.

Third Embodiment (Explanation of Construction of FM Radio Device)

Figure 3:
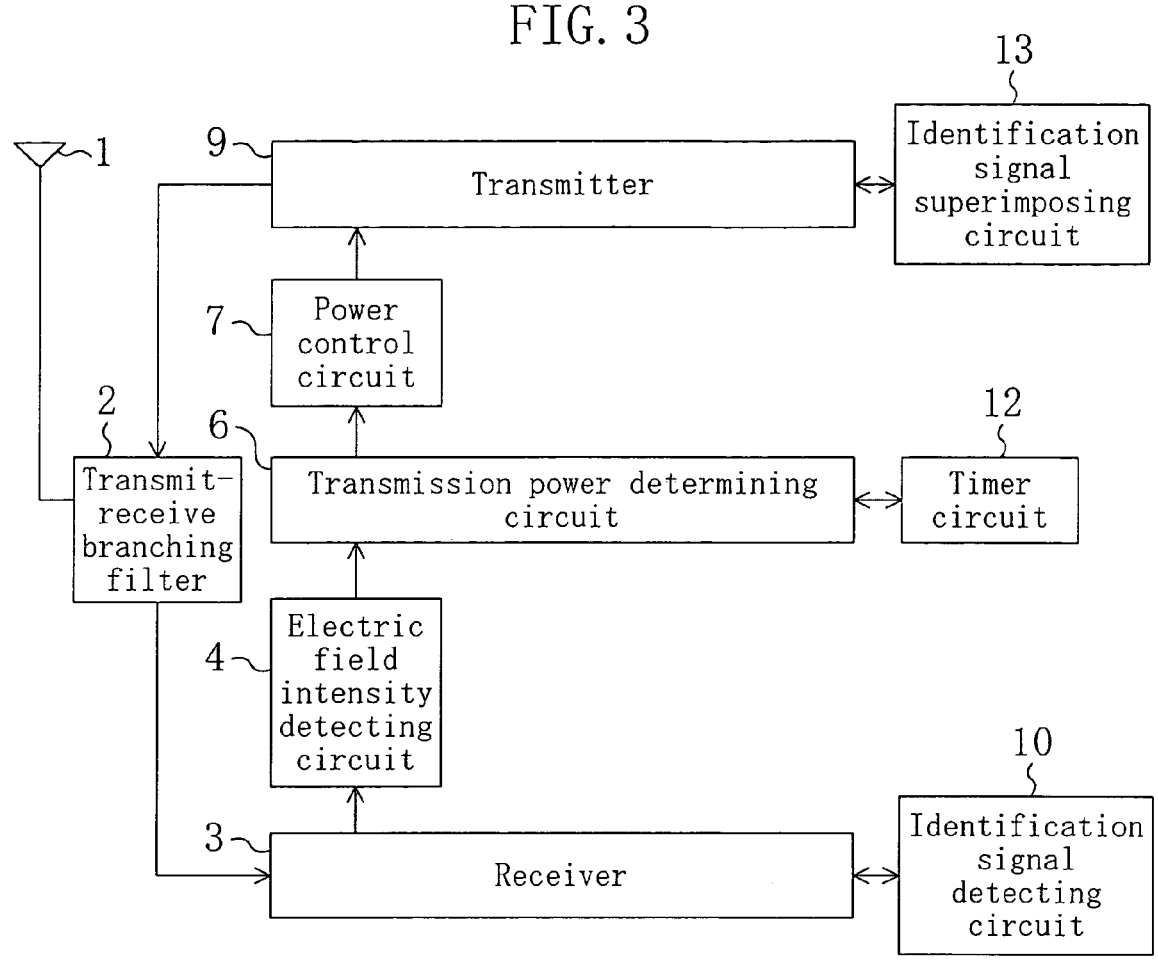
FIG. 3 is a block diagram showing a configuration example of a FM radio device according to a third embodiment of the present invention.

FIG. 3 is a block diagram showing a FM radio device according to a third embodiment of the present invention. The FM radio device of this embodiment is characterized in that the production cost is reduced since the circuit configuration is more simplified than that of the FM radio device according to the first and second embodiments.

Specifically, the FM radio device of this embodiment has the antenna 11, transmit-receive branching filter 2, receiver 3, identification signal detecting circuit 10, electric field intensity detecting circuit 4, transmission power determining circuit 6, timer circuit 12, power control circuit 7, transmitter 9 and identification signal superimposing circuit 13. The function of each circuit and each component are the same as that in the FM radio device of the first embodiment, so that the detailed explanations of these functions are omitted.

As shown in FIG. 3, the radio wave signal modulated by the baseband signal and including the information signal is received by the antenna 1, passes through the transmit-receive branching filter 2 and is frequency-converted and demodulated at the receiver 3 in the FM radio device in this embodiment. In the case where this radio wave signal is the one transmitted from the station to communicate with, the identification signal that is determined in advance between the home station and the station to communicate with is superimposed on the radio wave signal. In the case where the identification signal is included in the radio wave signal modulated by the baseband signal and received by the receiver 3, the identification signal detecting circuit 10 detects the identification signal and causes the frequency-converted and demodulated IF signal and the baseband signal to be output to the electric field intensity detecting circuit 4 from the receiver 3. Further, in the case where the identification signal of the station to communicate with is not included in the radio wave signal modulated by the baseband signal, the identification signal detecting circuit 10 brings the receiver 3 into a stand-by state and stops the signal output from the receiver 3.

Subsequently, if the identification signal of the station to communicate with is included in the radio wave signal modulated by the baseband signal, the reception electric field intensity of the radio wave signal is detected by the electric field intensity detecting circuit 4 and its detected result is output to the transmission power determining circuit 6.

Subsequently, the transmission power determining circuit 6 obtains the radio wave propagation state between the home station and the station to communicate with by using the reception electric field intensity of the information signal detected by the electric field intensity detecting circuit 4. If the communication interval is longer than the information holding time determined in advance, the timer circuit 12 invalidates the radio wave propagation state obtained upon the previous communication. Further, the timer circuit 12 switches the transmission output state of the home station between the maximum value and the controllable value every time interval determined in advance. Moreover, the transmission power determining circuit 6 determines the transmission power of the radio wave signal modulated by the baseband signal according to the transmission output state of the home station and the radio wave propagation state. The power control circuit 7 then controls the transmission power from the transmitter 9 to be the determined value. Further, the identification signal determined in advance between the home station and the station to communicate with is superimposed by the identification signal superimposing circuit 13. Then, the radio wave signal modulated by the baseband signal and including the identification signal, electric field intensity information and voice signal is transmitted from the transmitter 9 and sent to the station to communicate with from the home station via the transmit-receive branching filter 2 and the antenna 1.

An equation about one specific example of the power control in the case of starting the communication from the station to communicate with to the home station will be shown hereinafter. It should be noted that the station to communicate with has the same configuration as that of the FM radio device of this embodiment and the transmission power of the station to communicate with at the first communication is the maximum value.

"Transmission power of home station at first communication"="Transmission power (maximum value) of station to communicate with at first communication"+(Desired reception electric field intensity)−(Reception electric field intensity of home station), "Transmission power of station to communicate with at second communication"="Transmission power (maximum value) of station to communicate with at first communication"

The transmission power of the home station at the communication after the second communication is determined by the same manner as the transmission power of the home station at the first communication (Operation and Effect of FM Radio Device and Power Control Method of this Embodiment)

The FM radio device according to this embodiment identifies the station to communicate with by the identification signal detecting circuit 10 and does not output the information signal output from the other station as a voice even if such information signal is received. Therefore, unnecessary power consumption can be restrained, and further, inconvenience of decreasing the communication time to the station that should originally be communicated with can be prevented.

Additionally, the information holding time of the radio wave propagation state obtained by the timer circuit 12 is considered in the FM radio device of this embodiment, like the FM radio device of the first embodiment. Specifically, the radio wave propagation state at the previous communication is invalidated in the case where the communication interval is longer than the time determined in advance, thereby being capable of setting transmission power according to the change in the radio wave propagation state. Therefore, a problem of causing a trouble in the communication with the station to communicate with can be prevented.

Moreover, in the FM radio device of this embodiment, the transmission output of the home station is switched between the maximum value and the value controlled according to the radio wave propagation state every time interval determined in advance, whereby the communication with the station to communicate with can be stably performed as the power consumption of the home station and the station to communicate with is restrained, taking the transmission power information or reception noise information into consideration. Specifically, the reception electric field intensity of the home station and the desired reception electric field are compared and its result is reflected on the transmission power of the home station at the next communication, thereby being capable of solving the subject that the communication with the station to communicate with becomes unstable because of too restrained transmission power. Further, surplus power consumption can be reduced.

Additionally, the FM radio device of this embodiment has a simplified configuration, whereby the above-mentioned effects can be obtained, and further, the production cost can be reduced.

What is claimed is:

1. A FM radio device comprising:
   a receiver that receives a radio wave signal and frequency converts and demodulates the radio wave signal;
   an identification signal detecting circuit that judges whether a first identification signal, that is determined in advance between a home station and a station to communicate with, is superimposed on the radio wave signal;
   a transmitter that outputs a transmission radio wave signal;
   an electric field intensity detecting circuit that detects a reception electric field intensity of the radio wave signal received by the receiver;
   a transmission power determining circuit that obtains a radio wave propagation state between the home station and the station to communicate with by using at least the reception electric field intensity detected by the electric field intensity detecting circuit and determines transmission power of the transmission radio wave signal output from the transmitter based upon the radio wave propagation state;
   a power control circuit that controls the transmission power of the transmission radio wave signal output from the transmitter so as to become the transmission power determined by the transmission power determining circuit; and
   an identification signal superimposing circuit that superimposes a second identification signal, that is determined in advance between the home station and the station to communicate with, on the transmission radio wave signal output from the transmitter.

2. The FM radio device of claim 1, further comprising a timer circuit that invalidates the radio wave propagation state obtained at the previous reception, in the case where the interval between an end of communication and a restart of communication is longer than an information holding time determined in advance.

3. The FM radio device of claim 2, wherein the identification signal detecting circuit stops the output of a signal from the receiver, in the case where the radio wave signal does not include the first identification signal.

4. The FM radio device of claim 2, further comprising:
a transmission power information decoder that decodes first transmission power information indicating the electric field intensity of the radio wave signal transmitted from the station to communicate with;
a reception noise detecting circuit that detects power of a reception noise included in the radio wave signal; and
a transmission power information encoder that codes second transmission power information indicating the transmission power of the transmission radio wave signal determined by the transmission power determining circuit and superimposes the coded second transmission power information on the transmission radio wave signal output from the transmitter, wherein
the transmission power determining circuit obtains the radio wave propagation state between the home station and the station to communicate with by further using the transmission power information decoded by the transmission power decoder and the detected result by the reception noise detecting circuit.

5. The FM radio device of claim 2, further comprising:
an electric field intensity information decoder that decodes first reception electric field intensity information indicating the reception electric field intensity of the transmission radio wave signal output from the transmitter at the station to communicate with;
a reception noise detecting circuit that detects power of a reception noise included in the radio wave signal; and
a transmission power information encoder that codes second reception electric field intensity information indicating the reception electric field intensity of the radio wave signal received by the receiver and superimposes the coded second reception electric field intensity information on the transmission radio wave signal output from the transmitter.

6. A FM radio device comprising:
a receiver that receives a radio wave signal and frequency converts and demodulates the radio wave signal;
a transmitter that outputs a transmission radio wave signal;
an electric field intensity detecting circuit that detects the reception electric field intensity of the radio wave signal received by the receiver;
a transmission power determining circuit that obtains a radio wave propagation state between the home station and the station to communicate with by using at least the reception electric field intensity detected by the electric field intensity detecting circuit and determines transmission power of the transmission radio wave signal output from the transmitter based upon the radio wave propagation state;
a timer circuit that invalidates the radio wave propagation state obtained at the previous reception, in the case where the interval between an end of communication and a restart of communication is longer than an information holding time determined in advance; and
a power control circuit that controls the transmission power of the transmission information signal output from the transmitter so as to become the transmission power determined by the transmission power determining circuit.

7. A transmission power control method in a FM radio device having a receiver that frequency converts and demodulates a radio wave signal from a station to communicate with and a transmitter that outputs a transmission radio wave signal that is to be transmitted to the station to communicate with, comprising:
a step (a) of receiving by the receiver a radio wave signal;
a step (b) of judging whether a first identification signal determined in advance between a home station and the station to communicate with is included in the radio wave signal received at the step (a);
a step (c) of detecting a reception electric field intensity of the radio wave signal in the case where the first identification signal is judged to be included in the radio wave signal at the step (b);
a step (d) of obtaining a radio wave propagation state between the home station and the station to communicate with by using the reception electric field intensity detected at the step (c) and determining transmission power of the transmission radio wave signal output from the transmitter based upon the radio wave propagation state;
a step (e) of superimposing a second identification signal, determined in advance between the home station and the station to communicate with, on the transmission radio wave signal; and
a step (f) of controlling such that the transmission power of the transmission radio wave signal output from the transmitter takes the value determined at the step (d).

8. The transmission power control method of claim 7, further comprising:
a step (g) of invalidating the radio wave propagation state obtained upon the previous reception in the case where the interval between an end of communication and a restart of communication is longer than a predetermined information holding time.

9. The transmission power control method of claim 8, further comprising:
a step (h) of stopping the signal output from the receiver, in the case where the first identification signal is judged not to be included in the radio wave signal at the step (b).

10. The transmission power control method of claim 8, wherein
first transmission power information indicating transmission power of the radio wave signal transmitted from the station to communicate with is superimposed on the radio wave signal, and the transmission power control method further comprising:
a step (i) before the step (d) of decoding the first transmission power information;
a step (j) before the step (d) of detecting the power of the reception noise included in the radio wave signal; and
a step (k) of coding second transmission power information indicating the transmission power of the transmission radio wave signal determined at the step (d) and superimposing the coded second transmission power information on the transmission radio wave signal output from the transmitter, wherein
the radio wave propagation state is obtained by using further the first transmission power information decoded at the step (i) and the power of the reception noise detected at the step (j).

11. The transmission power control method of claim 8, wherein
first reception electric field intensity information indicating the reception electric field intensity of the transmission radio wave signal output from the transmitter at the station to communicate with is superimposed on the radio wave signal, and the transmission power control method further comprising:
a step (l) before the step (d) of decoding the first reception electric field intensity information;
a step (m) before the step (d) of detecting the power of the reception noise included in the radio wave signal; and
a step (n) of coding the second reception electric field intensity information indicating the reception electric field intensity of the radio wave signal received by the receiver and superimposing the coded second reception electric field intensity information on the transmission radio wave signal output from the transmitter, wherein the radio wave propagation state is obtained by using further the first reception electric field intensity information decoded at the step (l) and the power of the reception noise detected at the step (m).

12. The transmission power control method of claim 8, wherein
the transmission power of the transmission radio wave signal output from the transmitter is alternately switched by a constitution of a FM radio device at the step (f) between the case where it is set to the value determined at the step (d) and the case where it is set to the maximum value every time interval determined in advance.

* * * * *